(12) United States Patent
Taylor et al.

(10) Patent No.: US 9,593,222 B2
(45) Date of Patent: Mar. 14, 2017

(54) METHOD AND COMPOSITION FOR FILLING ELONGATED CHANNELS WITH EXPANDING FOAM INSULATION

(71) Applicant: ICP Adhesives and Sealants, Inc., Norton, OH (US)

(72) Inventors: Anthony J. Taylor, Medina, OH (US); Timothy R. Kenworthy, North Royalton, OH (US); Timothy C. Shoemaker, Akron, OH (US); Derrick T. Hyde, Bedford, PA (US); Jeffrey B. Moore, Wadsworth, OH (US)

(73) Assignee: ICP Adhesives and Sealants, Inc., Norton, OH (US)

( * ) Notice: Subject to any disclaimer, the term of this patent is extended or adjusted under 35 U.S.C. 154(b) by 643 days.

(21) Appl. No.: 13/893,443

(22) Filed: May 14, 2013

(65) Prior Publication Data
US 2014/0339723 A1    Nov. 20, 2014

(51) Int. Cl.
| | |
|---|---|
| *B29C 44/38* | (2006.01) |
| *C08J 9/12* | (2006.01) |
| *C08J 9/00* | (2006.01) |
| *C08J 9/14* | (2006.01) |
| *C08G 18/48* | (2006.01) |
| *C08G 18/76* | (2006.01) |
| *C08G 18/16* | (2006.01) |

(Continued)

(52) U.S. Cl.
CPC ............... *C08J 9/127* (2013.01); *B29C 44/38* (2013.01); *C08G 18/165* (2013.01); *C08G 18/1808* (2013.01); *C08G 18/283* (2013.01); *C08G 18/4816* (2013.01); *C08G 18/4883* (2013.01); *C08G 18/7664* (2013.01); *C08J 9/0028* (2013.01); *C08J 9/0038* (2013.01); *C08J 9/144* (2013.01); *C08J 9/146* (2013.01); *C08J 9/147* (2013.01); *C08J 9/149* (2013.01); *C08G 2101/005* (2013.01); *C08J 2201/022* (2013.01); *C08J 2203/10* (2013.01); *C08J 2203/142* (2013.01); *C08J 2203/162* (2013.01); *C08J 2203/182* (2013.01); *C08J 2375/04* (2013.01); *E06B 3/267* (2013.01); *E06B 3/26345* (2013.01)

(58) Field of Classification Search
CPC .................................................... B29C 44/38
See application file for complete search history.

(56) References Cited

U.S. PATENT DOCUMENTS

| | | |
|---|---|---|
| 4,128,934 A | 12/1978 | Doring |
| 5,129,975 A | 7/1992 | Easterle et al. |

(Continued)

OTHER PUBLICATIONS

Zhang, X.D., et al; Role of Silicone Surfactant in Flexible Polyurethane Foam, Journal of Colloid and Interface Science 215, 1999, pp. 270-279.

(Continued)

*Primary Examiner* — Ryan Ochylski
(74) *Attorney, Agent, or Firm* — Hahn Loeser & Parks LLP

(57) ABSTRACT

The invention described herein generally pertains to the use of low boiling point, low vapor pressure blowing agents with froth polyurethane or polyisocyanurate foams to fill hollow cavities (particularly window lineals) and which have lowered exotherms, which prevent deformation of the hollow cavity (e.g., window lineal) and additional achieve filling of longer lengths of window lineals by increasing the foaming and gel times of the reaction.

18 Claims, 1 Drawing Sheet

(51) Int. Cl.
  *C08G 18/18* (2006.01)
  *C08G 18/28* (2006.01)
  *E06B 3/267* (2006.01)
  *E06B 3/263* (2006.01)
  *C08G 101/00* (2006.01)

(56) References Cited

U.S. PATENT DOCUMENTS

| | | | |
|---|---|---|---|
| 5,310,766 A * | 5/1994 | Baumann | C08G 18/4009 521/117 |
| 5,693,684 A * | 12/1997 | Rader | B29C 44/022 521/131 |
| 5,807,514 A | 9/1998 | Grinshpun et al. | |
| 5,876,641 A | 3/1999 | LeClair et al. | |
| 5,942,173 A | 8/1999 | Cole et al. | |
| 6,003,277 A | 12/1999 | Graham et al. | |
| 6,068,802 A | 5/2000 | Berghorn et al. | |
| 6,121,336 A | 9/2000 | Okoroafor et al. | |
| 6,506,810 B2 | 1/2003 | Borgogelli et al. | |
| 6,881,365 B2 | 4/2005 | Topp | |
| 8,680,168 B2 * | 3/2014 | Fishback | C08G 18/4829 427/230 |
| 9,062,168 B2 * | 6/2015 | Taylor | C08J 9/144 |
| 2004/0069971 A1 * | 4/2004 | Witteveen | C08G 18/1825 252/182.13 |
| 2009/0082478 A1 * | 3/2009 | Lund | H04M 1/745 521/131 |
| 2012/0121805 A1 * | 5/2012 | Fishback | C08G 18/4829 427/230 |
| 2014/0100299 A1 * | 4/2014 | Taylor | C08J 9/144 521/131 |

OTHER PUBLICATIONS

Non-flammable and Low GWP Blowing Agent for Spray Foam Insulation, Honeywell, brochure dated Sep. 2012.
Dabco T Catalyst, Air Products Polyurethane Additives Product Bulletin, single page brochure, undated.
Loh, Gary et al, Further Development of FEA-1100: a Low GWP Foam Expansion Agent, Dupont, Polyurethane 2010 Technical Conference, Houston, Texas, 25 pages, 2010.

* cited by examiner

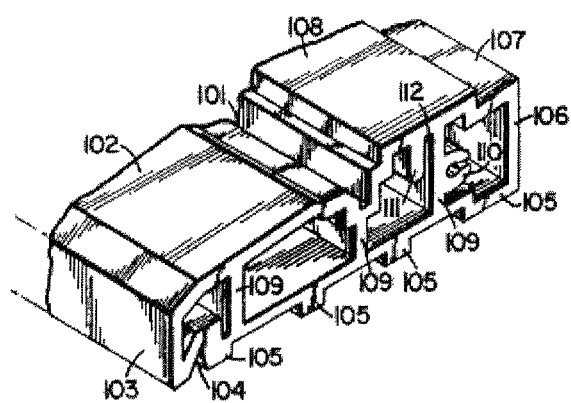

METHOD AND COMPOSITION FOR FILLING ELONGATED CHANNELS WITH EXPANDING FOAM INSULATION

TECHNICAL FIELD

The invention described herein pertains generally to a method and composition-of-matter for employing expanding polymeric foams to fill elongated channels without expanding the cross-sectional profile of the elongated channel, particularly for use in filling vinyl and metallic (e.g., aluminum) window lineal channels of at least eight (8) lineal feet (2.44 meters), and preferably, in excess of sixteen (16) or more lineal feet (4.88 meters) in length.

BACKGROUND OF THE INVENTION

In today's energy conservation conscious world, finding ways to better insulate our homes, is foremost on the minds of a great many people. Many different materials have been used for such insulation. For example, fiberglass insulation provides good insulation characteristics for insulation of walls, ceilings, etc. of homes. However, this type of insulation is not capable of insulating narrow hollow cavities within window lineals which are prevalently used in replacement vinyl windows.

Present commercial methods of filling channels of an extruded lineal with liquid foamable resin result in substantial voids throughout the length of the channel, reducing the advantages of filling the channel with foam. In one method, a foam application gun is equipped with a metal tubular extension of three feet or longer. The extension is inserted into one open end of the lineal channel and liquid foamable polyurethane foam is then dispensed into the channel. The channel is moved away from the gun to fill one-half of the channel and the process repeated from the opposite end. In another method, a polyurethane pour gun is fitted with a flexible hose which is inserted several feet into the lineal channel. The hose is then withdrawn as the liquid polyurethane foam is poured into the lineal channel, allowing the filling of the lineal channel from one end. The rate of withdrawal of the hose must be accurately controlled and one operator generally withdraws the hose as the second operator operates the pour gun. However, either method typically results in substantial voids throughout the lineal channel or inconsistent filling.

Another method is to fill elongated channels by directing a stream of liquid foamable polymeric resin into the channel from one end. The lineal is first oriented at an angle generally of about 60° and the application gun is then operated to direct a thin elongated stream of foamable polyurethane into the lineal from the top open end, preferably coincident with the longitudinal axis of the channel, such that the stream impinges at or near the bottom of the channel and the foam rises upwardly through the channel and fills the channel. It is believed that at least one problem with this approach is that the application gun covers the open end of the channel such that the operator cannot accurately align the stream of liquid foamable resin into the channel. If the nozzle of the application gun is not accurately aligned with the longitudinal axis of the channel, the stream will impinge the side wall of the channel creating a backflowing/expanding foam that in turn, blocks the stream and prevents complete filling of the channel. This is a problem in mass production applications in that the channels are relatively small in cross-section and the length of the channel is generally twelve or sixteen feet in length.

Therefore, it is easily seen that what is needed is a way to dispense foam into elongated hollow cavities in which there is minimal to no damage to the original cross-sectional dimensions of the profile, regardless of whether that deformation is attributable to heat or pressure due to foam expansion or combinations thereof.

SUMMARY OF THE INVENTION

In accordance with the present invention, there is provided a frothable foam which upon expansion, will fill a cavity, more specifically, a horizontally oriented widow lineal that exhibits a large surface to volume ratio over a considerable distance in a manner that minimal to no voids are produced upon the curing of the extruded foam when added without a seal on either end of the lineal.

It is yet another aspect of the invention to provide a method of introducing a frothable foam into a window lineal used to product a finished window that will be more uniformly insulated in the lineal cavities.

The above and other aspects of the invention are achieved by using low pressure, high boiling point blowing agents, either neat or as a miscible blend or azeotrope with other blowing agents, recognizing that the invention encompasses future blowing agents having characteristics defined herein, particularly higher boiling points.

In broad terms, the invention describes a composition and a process for filling a cavity with a frothable polyurethane or by logical extension, to a polyisocyanurate foam system, without bowing or deforming a cross-sectional profile of an extrudate (e.g., vinyl), the process comprising the step of:

A process for filling a window lineal cavity with a frothable polyurethane or a polyisocyanurate foam system without deforming a window lineal profile, said process comprising the step of:

adding a two-component polyurethane or polyisocyanurate foam to said cavity, said foam comprising an effective amount of at least one blowing agent, including miscible blends and azeotropes thereof, said blowing agent comprising formula (I):

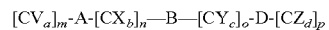

$$[CV_a]_m\text{-}A\text{-}[CX_b]_n\text{—}B\text{—}[CY_c]_o\text{-}D\text{-}[CZ_d]_p$$

wherein
C is a carbon atom;
V, X, Y and Z are independently selected from the group consisting of H, F and Cl;
a & d are independently selected from the integral values ranging from 0 to 3 inclusive;
b & c are independently selected from the integral values ranging from 0 to 2 inclusive;
o, p & n are equal to 1;
m is selected from the integral values ranging from 0 to 1 inclusive;
A, B and D are covalent bonds sufficient to satisfy the available bonding sites of adjacent carbon atoms, if such carbon atoms are present;
said at least one blowing agent having a boiling point between approximately 5-50° C., and an ozone depletion potential of not greater than 0.05;
said foam system having a reaction profile gel and tack time which is approximately between 2-6 minutes, said times attributable at least in part to a "B-side" composition which comprises:
approximately between 0.4-2 weight % of at least one amine catalyst;
approximately between 3-20 weight % of a polyol blend;

approximately between 25-50 weight % of at least one phosphate flame retardant;

approximately between 30-58 weight % of at least one non-ionic surfactant;

a balance of water, said balance being no less than about 10-20 weight %;

components within said "B-side" composition adjusted to total 100%.

In a more preferred embodiment, the amine catalyst is added at approximately between 0.5-1.5 weight % of said "B-side." Examples of formula (I) include: HFC-245fa, HFC-365mfc, HBA-2, FEA-1100, AFA-L1, AFA-L2, miscible blends and azeotropes thereof and further wherein formula (I) is a major amount of said blowing agent, which has a boiling point between approximately 10-40° C. The process will have a reaction profile gel and tack time of approximately between 2-6 minutes (more preferably 2-4 minutes); and a peak reaction exotherm which is no higher than about 180° F. (82° C.).

The process of adding the frothable polyurethane or the polyisocyanurate foam system proceeds by adding into a proximal side of the window lineal and allowing the polymerization to proceed toward a distal side of said window lineal, both said proximal and distal sides being open. Preferably, the process has the window lineal in a horizontal position during the step of adding.

The invention and blowing agents applicable therein are not limited to 3-4 carbon moieties, but are capable of being 4-6 carbon moieties as illustrated below in Formula (II),

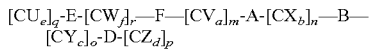

wherein

C is a carbon atom;

U, W, V, X, Y and Z are independently selected from the group consisting of H, F and Cl;

d & e are independently selected from the integral values ranging from 0 to 3 inclusive;

a, b, c & f are independently selected from the integral values ranging from 0 to 2 inclusive;

o, p & n are equal to 1;

m, q & r are independently selected from the integral values ranging from 0 to 1 inclusive;

A, B, D, E and F are covalent bonds sufficient to satisfy the available bonding sites of adjacent carbon atoms, if such carbon atoms are present;

said at least one blowing agent having a boiling point between approximately 5-50° C., and an ozone depletion potential of not greater than 0.05;

said foam system having a reaction profile gel and tack time which is approximately between 2-6 minutes, said times attributable at least in part to a "B-side" composition which comprises:

approximately between 0.4-2 weight % of at least one amine catalyst;

approximately between 3-20 weight % of a polyol blend;

approximately between 25-50 weight % of at least one phosphate flame retardant;

approximately between 30-58 weight % of at least one non-ionic surfactant;

a balance of water, said balance being no less than about 10-20 weight %;

components within said "B-side" composition adjusted to total 100%.

In a manner similar to that described previously, the covalent bonds A, B, D, E and F are independently selected from the group consisting of single, double and triple covalent bonds. Illustrative examples of blowing agents falling within Formula (II) include HFC-245fa, HBA-2 (SOLSTICE™ LBA), FEA-1100, AFA-L1, AFA-L2, miscible blends and azeotropes thereof and further wherein formula (II) is a major amount of said blowing agent. The blowing agent has a boiling point between approximately 10-40° C.

The amine catalyst is more preferably added at approximately between 0.5-1.5 weight % of said "B-side" which defines a reaction profile gel and tack time to be between approximately 2-6 minutes (more preferably between 2-4 minutes) and a peak reaction exotherm no higher than about 180° F. (82° C.).

The process further comprises the step of adding the frothable polyurethane or the polyisocyanurate foam system into a proximal side of the window lineal and allowing the polymerization to proceed toward a distal side of the window lineal, both the proximal and distal sides being open. In a more preferred embodiment, the step of adding to the window lineal will occur while the window lineal is in a horizontal position.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawing which form a part hereof, and wherein:

FIG. 1 is a perspective view from above showing an exemplary extruded or injection molded window lineal, the cavities of which are to be filled with foam.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

The invention relates to improved polyurethane and polyisocyanurate foams, which employ at least an effective amount of a low pressure, higher boiling point blowing agent(s) including miscible blends thereof to fill cavities (e.g., window lineals as illustrated in FIG. 1).

FIG. 1 is a perspective view from above of an extruded or injection molded lineal member. The lineal may be adapted for installation into the base or support for the door frame or into a window opening. A sill can be snap-fit onto the extruded sill by installation onto the extruded sill at a snap-fit attachment groove 101 over the snap-fit land 102, the exterior face 103 ending in the snap-fit groove 104 for a mechanically secure attachment. The lineal rests on a base supported by the sill rests 105. The interior installation face 106 abuts the base or trim additional components of the assembled unit. After the unit is installed, an oak threshold is installed onto the oak threshold lands 107 and 108. The oak threshold has faces milled to match the threshold land areas. The interior of the lineal shows vertical support webs 109. The support webs 109 provide compression strength supporting the top of the unit, the snap-fit lands 102 and the oak threshold lands 107 and 108. The unit also includes a C-shaped fastener anchor 110 which is molded integrally with the support web 109. The typical fastener such as a screw can pass into the anchor space in the anchor 110. An additional attachment web 111 is coextruded with the oak threshold land 109 providing an attachment anchor valley 112 for screws passing vertically through the oak threshold land 108 into the valley screw anchor 112. The voids present in the lineal member are what are desired to be filled with a non-deforming foam over long lengths of lineal.

As used in this application, a non-limiting exemplary definition for the term "polyurethane" or "PUR", which includes mixtures of polyurethanes, means a class of reaction polymers in which a urethane linkage is produced by reacting an isocyanate group, —N=C=O with an hydroxyl (alcohol) group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, $R—(N=C=O)_{n \geq 2}$ and a polyol is a molecule with two or more hydroxyl functional groups, $R'—(OH)_{n \geq 2}$. The reaction product is a polymer containing the urethane linkage, —RNHCOOR'—. Isocyanates will react with any molecule that contains an active hydrogen. Importantly, isocyanates react with water to form a urea linkage and carbon dioxide gas. Commercially, polyurethanes are produced by reacting a liquid isocyanate with a liquid blend of polyols, catalyst, and other additives. The isocyanate is commonly referred to in North America as the "A-side" or just the "iso". The blend of polyols and other additives is commonly referred to as the "B-side" or as the "poly". In Europe these meanings are reversed.

As used in this application, a non-limiting exemplary definition for the term "isocyanate", which includes mixtures of isocyanates, means a moiety which contains an —N=C=O arrangement of chemical elements. Molecules that contain two isocyanate groups are called diisocyanates. Isocyanates can be classed as aromatic, such as diphenylmethane diisocyanate ("MDI") or toluene diisocyanate ("TDI"); or aliphatic, such as hexamethylene diisocyanate ("HDI"). An example of a polymeric isocyanate is polymeric diphenylmethane diisocyanate, which is a blend of molecules with two-, three-, and four- or more isocyanate groups, with an average functionality of 2.7. Isocyanates can be further modified by partially reacting them with a polyol to form a prepolymer. Important characteristics of isocyanates are their molecular backbone, % —N=C=O content, functionality, and viscosity. Any organic polyisocyanate can be employed in the polyurethane or polyisocyanurate foam synthesis inclusive of aliphatic and aromatic polyisocyanates. Suitable organic polyisocyanates include aliphatic, cycloaliphatic, arylaliphatic, aromatic, and heterocyclic isocyanates which are well known in the field of polyurethane chemistry. Representative organic polyisocyanates correspond to the formula:

$$R(NCO)_z$$

wherein R is a polyvalent organic radical which is either aliphatic, arylalkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5-'tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene diisocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like.

As used in this application, a non-limiting exemplary definition for the term "polyol", which includes mixtures of polyols, can be any polyol which reacts in a known fashion with an isocyanate in preparing a polyurethane or polyisocyanurate foam. In one sense, polyol means a moiety which contains more than one hydroxyl group. Molecules that contain two hydroxyl groups are called diols, those with three hydroxyl groups are called triols, et cetera. Polyols are polymers in their own right. They are formed by basecatalyzed addition of propylene oxide ("PO"), ethylene oxide ("EO") onto a hydroxyl or amine containing initiator, or by polyesterification of a di-acid, such as adipic acid, with glycols, such as ethylene glycol ("EG") or dipropylene glycol ("DPG"). Polyols extended with PO or EO are polyether polyols. Polyols formed by polyesterification are polyester polyols. The choice of initiator, extender, and molecular weight of the polyol greatly affect its physical state, and the physical properties of the polyurethane polymer. Important characteristics of polyols are their molecular backbone, initiator, molecular weight, % primary hydroxyl groups, functionality, and viscosity. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; polyols derived from natural products (e.g. soy beans), glycerol; ethylene glycol; diethylene glycol; propylene glycol; graft copolymers of polyether polyols with a vinyl polymer; a copolymer of a polyether polyol with a polyurea; one or more of (a) condensed with one or more of (b) as illustrated by (a) glycerine, ethylene glycol, diethylene glycol, trimethylolpropane, ethylene diamine, pentaerythritol, soy oil, lecithin, tall oil, palm oil, castor oil; and (b) ethylene oxide, propylene oxide, a mixture of ethylene oxide and propylene oxide; or combinations thereof.

As used in this application, a non-limiting exemplary definition for the term "polyol premix", which includes mixtures of polyol premixes, means a polyol premix which includes a catalyst. Useful catalysts are primary amines, secondary amines or most typical tertiary amines. Useful tertiary amine catalysts non-exclusively include dicyclohexylmethylamine; ethyldiisopropylamine; dimethylcyclohexylamine; dimethylisopropylamine; methylisopropylbenzylamine; methylcyclopentylbenzylamine; isopropyl-secbutyl-trifluoroethylamine; diethyl-(α-phenylethyl)amine, tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-α-phenylethyl)amine; or combinations thereof. Useful primary amine catalysts non-exclusively include: triphenylmethylamine and 1,1-diethyl-n-propylamine. Other useful amines include morpholines, imidazoles, ether containing compounds, and the like. These include dimorpholinodiethylether; N-ethylmorpholine; N-methylmorpholine; bis(dimethylaminoethyl)ether; imidazole; n-methylimidazole; 1,2-dimethylimidazol; dimorpholinodimethylether; N,N,N',N',N",N"-pentamethyldiethylenetriamine; N,N,N',N',N",N"-pentaethyldiethylentriamine; N,N,N',N',N",N"-pentamethyldipropylenetriamine; bis(diethylaminoethyl)ether; and bis(dimethylaminopropyl)ether. The polyol premix composition may contain an optional silicone surfactant. The silicone surfactant is used to form a foam from the mixture, as well as to control surface tension that impacts the size of the bubbles of the foam so that a foam of a desired open or closed cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise. The polyol premix composition may optionally contain a non-silicone surfactant, such as a non-silicone, non-ionic surfactant. These may include oxyethylated alkylphenols, oxyethylated fatty alcohols, paraffin oils, castor oil esters, ricinoleic acid esters, turkey red oil, groundnut oil, paraffins and fatty alcohols. A preferred non-silicone surfactant is LK-443 which is commercially available from Air Products Corporation.

As used in this application, a non-limiting exemplary definition for the term "polyisocyanurate" or "PIR", which includes mixtures of polyisocyanurates, means the reaction the reaction product of MDI and a polyol, which typically takes place at higher temperatures compared to the reaction temperature for the manufacture of PUR. Without being limited to any theory of operation or synthesis, at these elevated temperatures and in the presence of specific catalysts, MDI will first react with itself, producing a stiff, ring molecule, which is a reactive intermediate (a tri-isocyanate isocyanurate compound). Remaining MDI and the tri-isocyanate react with polyol to form a complex poly(urethane-isocyanurate) polymer, which is foamed in the presence of a suitable blowing agent. This isocyanurate polymer has a relatively strong molecular structure, because of the combination of strong chemical bonds, the ring structure of isocyanurate and high cross link density, each contributing to the greater stiffness than found in comparable polyurethanes. The greater bond strength also means these are more difficult to break, and as a result a PIR foam is chemically and thermally more stable: breakdown of isocyanurate bonds is reported to start above 200° C., compared with urethane at 100-110° C. PIR typically has an MDI/polyol ratio, also called its index (based on isocyanate/polyol stoichiometry to produce urethane alone), of between 200 and 500. By comparison PUR indices are normally around 100. As the index increases material stiffness but also brittleness also increase, although the correlation is not linear. Depending on the product application greater stiffness, chemical and/or thermal stability may be desirable. As such PIR manufacturers offer multiple products with identical densities but different indices in an attempt to achieve optimal end use performance.

As used in this application, a non-limiting definition for the term "blowing agent" which includes miscible mixtures and azeotropes of blowing agents, means a propellant or solvent which are useful and provide efficacy to various applications in the form of insulation performance, pressure performance, or solubility, without deleterious effect due to molar gas volume, flammability migration, or GWP reduction, yet which have a vapor pressure within defined limits as defined herein. Exemplary and non-limiting blowing agents include HFC-245fa (Honeywell Intl.), namely 1,1,1, 3,3 pentafluoropentane or FEA-1100 (DuPont), namely 1,1, 1,4,4,4 hexafluoro-2-butene.

It is often necessary or even desirable to mitigate the global warming potential ("GWP") of blowing agent, aerosol, or solvent compositions. As used herein, GWP is measured relative to that of carbon dioxide and over a 100 year time horizon, as defined in "The Scientific Assessment of Ozone Depletion, 2002, a report of the World Meteorological Association's Global Ozone Research and Monitoring Project." In certain preferred forms, the present compositions also preferably have an Ozone Depletion Potential ("ODP") of not greater than 0.05, more preferably not greater than 0.02 and even more preferably about zero. As used herein, "ODP" is as defined in "The Scientific Assessment of Ozone Depletion, 2002, A Report of the World Meteorological Association's Global Ozone Research and Monitoring Project."

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of insulation performance, pressure performance, or solubility, without deleterious effect due to molar gas volume, flammability mitigation, or GWP reduction. These co-agents include but are not limited to: one or more additional components of hydrofluorocarbons, $C_1$ to $C_6$ hydrocarbons, $C_1$ to $C_8$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1,1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), and cis- and trans-1,2,3,3-tetrafluoropropene (HFO-1234ye), HFC-1233zd, and HFC-1225ye. Preferred co-blowing agents non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $00_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141 b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term, "effective amount" means a quantity sufficient to improve the result of the foaming operation when compared to a control without the added low pressure blowing agent.

As used herein, a non-limiting definition for the term, "higher boiling point blowing agent" means a blowing agent having a boiling point at atmospheric pressure of between ~5° C. to ~50° C., more preferably ~10° C. to ~40° C.

As used herein, a non-limiting definition for the term "lower pressure blowing agent" means a blowing agent having a vapor pressure of between ~5 psig to ~30 psig at approximately room temperature, ~75° F. (equivalently ~34.5 kPa to ~206.9 kPa at approximately room temperature, ~24° C.).

As used herein, a non-limiting definition for the term "approximately" means a deviation from the stated end points of a range of 10%.

ponents capable of forming foam comprise a thermosetting composition capable of forming foam and/or foamable compositions. Examples of thermosetting compositions include polyurethane and polyisocyanurate foam compositions. These include polyurethane pre-polymers. This reaction and foaming process may be enhanced through the use of various additives such as catalysts and surfactant materials that serve to control and adjust cell size and to stabilize the foam structure during formation. Furthermore, it is contemplated that any one or more of the additional components described above with respect to the blowing agent compositions of the present invention could be incorporated into the foamable composition of the present invention. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The polymerization reaction is catalyzed by tertiary amines, such as dimethylcyclohexylamine, and organometallic compounds, such as dibutyltin dilaurate or bismuth octanoate. Furthermore, catalysts can be chosen based on whether they favor the urethane (gel) reaction, such as 1,4-diazabicyclo[2.2.2]octane (also called DABCO or TEDA), or the urea (blow) reaction, such as bis-(2-dimethylaminoethyl)ether, or specifically drive the isocyanurate trimerization reaction, such as potassium octanoate.

At its simplest level, the distinction between PIR and PUR polymers is not large. The proportion of MDI is higher for FIR than for PUR and instead of a polyether polyol, a polyester derived polyol is used in the reaction. Catalysts and additives used in PIR formulations also differ from those used in PUR.

The properties of foam expansion agents is listed in Table I, as well as various physical properties therewith.

TABLE I

|  | CFC-11 | HCFC-141b | HFC-245fa | HFC-134a | HFC-365mfc | HCFO-1233zd | Isopentane | FEA-1100 |
| --- | --- | --- | --- | --- | --- | --- | --- | --- |
| ODP | 1 | 0.12 | 0 | 0 | 0 | ~0 | 0 | 0 |
| GWP (100 year ITH) | 4750 | 725 | 1020 | 1300 | 782 | <5 | 11 | 5 |
| E gas 25° C. mW/mK | 8.4 | 9.7 | 12.7 | 14.5 | 10.5 | 10.2 | 13.3 | 10.7 |
| Flash Point | None | None | None | None | −25.0° C. | None | −51° C. | None |
| bp ° C. | 23.9 | 32.1 | 15.3 | −26.3 | 40.0 | 19 | 27.9 | >25 |

As used herein, a non-limiting definition for "deforming a window lineal profile" means a deviation from the original cross-sectional profile dimensions by an amount which does not impact the ability to use a profile which has a majority of its cavities filled with foam in its intended application in comparison to a profile which did not have any filled cavities.

One aspect of the present invention provides foamable compositions. As is known to those skilled in the art, foamable compositions generally include one or more foam forming agents capable of forming a foam and a blowing agent.

This includes a component, or a combination on components, which are capable of forming a generally open cell foam structure. The foamable compositions of the present invention include such components and the above described blowing agent compound in accordance with the present invention. In certain embodiments, the one or more com- The experimental data presented herein centers on the use of a low vapor pressure blowing agent, such as that illustrated by HFC-245fa (1,1,1-3,3-pentafluoropropane) although others such as FEA-1100 (1,1,1,4,4,4-hexafluoro-2-butene) are believed to be applicable to this invention, used alone or in miscible blends with other blowing agents. Both FEA-1100 (DuPont) and HFC-245fa have low vapor pressures at room temperature. Both blowing agents have a vapor pressure at 50° C. which is well below that of a typical drum pressure rating of 22 psig. Additional fourth generation blowing agents are also within the scope of this invention, e.g., AFA-L1 & AFA-L2 (Arkema), HBA-2 ((Honeywell SOLSTICE™ LBA) or trans-1-chloro-3,3,3-trifluoropropene) in that they also meet the criteria of higher boiling point and lower vapor pressure as defined herein with minimal to no ozone depletion potential.

The choice of blowing agent is largely driven by the Environmental Protection Agency of the United States ("EPA"), a zero ozone-depletion potential ("ODP"), as well as Department of Transportation ("DOT") flammability regulations. Environmental concerns with ozone depletion rule out the use of the extremely ozone-depleting CFC-1, banned in 1995, and HCF-141b, banned in 2003. Without restricting this invention to the exclusive use of non-flammable blowing agents in a composition, in a preferred embodiment, non-flammable blowing agents are preferred over flammable blowing agents. DOT regulations prevent the filling of commonly-used, standard-in-the-industry disposable and refill cylinders with flammable blowing agents. From the above chart, this leaves HFC-134a, HFC-245fa and FEA-1100 as the only permissible blowing agents. The intent of the invention is to produce a low pressure build, PUR/PIR insulation system applied via low pressure disposable and refill equipment that demonstrates superior flowability while maintaining desirable properties such as being dimensionally stable (will not shrink) provide for an air barrier and insulate. HFC-134a is eliminated from being a suitable blowing agent due to its low boiling point. Upon dispensing HFC-134a blown formulations from low pressure systems, the rapid expansion of the foam and viscous, frothy state of the foam prevent the system from flowing around cavity obstructions and thereby produces undesirable void spaces in the cavity resulting in a compromised air seal and insufficient insulation. This dictates that only non-flammable, non-ozone depleting blowing agents with relatively high boiling points can effectively provide for adequate filling of an obstructed cavity. Though it is intuitively obvious that the greater the solubility of the blowing agent the greater the flow of the resultant froth, this factor does not dictate performance as does the high boiling point of the blowing agent. The KB value of HFC-245fa is six (6) while the KB value of FEA-1100 is seven (7). The Kauri-butanol value is a semi-qualitative measure of a blowing agent's solubility in a standard solution of kauri gum in butyl alcohol as outlined in ASTM D 1133.

Without being limited to any one theory or mode of operation, it is believed that the combination of a higher boiling point in the range of approximately 5° C. to 50° C., more preferably approximately 10° C. to 40° C. provide at least in part, the unexpected flowability results of this invention.

In the present invention, there is no need to place the window lineal at an angle, e.g., 30-60° to achieve substantially complete fills over a distance of between 8-16 feet (2.44-4.88 m) or more. In fact, the lineal may be placed horizontally and has been demonstrated to provide essentially complete fill over a distance of greater than 20 feet (6.10 m), and in some instances, approximately 30 feet (9.14 m) or more.

The maximum pressure of either the A or B-side cylinders do not exceed 220 psig and have been tested as effective with pressures as low as 180 psig. This is significantly lower than 400 psig typically used in the industry, necessitated by the conventional wisdom that high pressure and a unique narrow nozzle were required to carry the stream downward through the channel and for a substantial distance prior to contacting the inside walls of the channel and "creaming" thereby avoiding blocking of the flow of liquid foamable resin through the channel. The use of high boiling point blowing agents eliminates these issues, and the window lineal hollow will completely fill regardless of the foam resin contacting the sides of the hollow.

Unlike prior art solutions, the liquid foamable resin fills the cavity by flowing in precisely the opposite direction of the prior art. The cavity fill is from the proximal end to the distal end, rather than vice-versa as taught by the prior art. The driving force in the present invention is caused by the evolution of carbon dioxide ($CO_2$) gas resulting from the pMDI/water or polyurea reaction which, creating entrapped gas pockets, "pushes" the low viscosity, pre-cream state foam mixture down the window lineal to the open pressure-relieving end of the window lineal.

The present invention uses a low pressure, polyurethane pour-in-place system which demonstrates suitable adhesion to the interior window lineal hollow. A high output spray gun is used in combination with an approximately 7.5 inch (19.05 cm) long helical static mixer to apply the foam having a 24 turn mixing element. One spray gun applicable is a Handi-Gun® Foam Dispensing unit connected to two eight gallon refill tanks, the gun manufactured by Fomo Products, Inc. In a preferred embodiment, the system needs to maintain a range for the NB ratio of +/−0.05, the tolerance typically maintained by the use of a two-step nitrogen regulator. In a further preferred embodiment, the chemical temperature within each tank should be maintained at 65-85° F. (18.33-29.44° C.). Higher temperatures are believed to cause excessive back-pressure/leakage, increase the peak exotherm and cause a fast, rather than a more desirable, slow evolution of $CO_2$. These adverse factors can lead to rapid pressure and temperature builds, causing distortion or deformation of the window lineal from its original cross-sectional profile.

Without being held to any one theory of operation or interaction, it is believed that the high boiling point of HFC-245fa (59.5° F. (15.28° C.)) as compared to the boiling point of HFC-134a (−15.3° F. (−26.28° C.)) permits the foam froth to say in a more liquid than froth state. The liquid state, dependent on the high boiling point of HFC-245fa blowing agent, diminishes the amount of viscous drag the free flowing foam experiences as it is traveling down the hollow window lineal. These hollow voids have a rather large surface area to volume ratio. The larger the surface area to volume ratio, the greater the amount of viscous drag the hollow filling foam will experience. Filling a window lineal with a hollow or like dimensions using a 1:1 by weight substitution of HFC-134a/water for HFC-245fa/water while holding all other aspects of the formulation constant, produced a foam that would only travel 4-7 feet (1.22-2.13 m) down the hollow. Conversely, the same formulation, being HFC-245fa/water blown, will travel in excess of 20 feet (6.10 m), possibly 30 feet (9.14 m) or greater. In fact, experiments have shown that formulations can travel in excess of 40 feet through convoluted 0.5 inch I.D. vinyl hose. The water produces a low density open-cell free rise foam. The in-place foam, dependent on geometry and the decrease of packing, can be from 1.5 to 2.0 pcf.

In addition, a higher than normal concentration of monofunctional nonionic surfactants on the "B-side" formulation assists in the chain termination of the polyurethane reaction. As used in one aspect of the invention, Surfonic N-95 is employed at 44.7% (ethylene oxide content of 65.5% & HLB value of 13.1) while Huntsman L12-8 (ethylene oxide content of 68% & HLB value of 13.6) is employed at 1%. It is believed, without being held to any one theory of operation, that these surfactants serve a dual purpose of emulsifying the hydrophilic/hydrophobic constituents of the "B-side" blend while lowering the crosslink density of the cured foam so that it will pack without producing excessive pressure that would distort the window lineal.

Further, the catalyst package is employed at a lowered amount, preferably 0.4-2%, more preferably 0.5-1.5%, even more preferably 0.5-1%, most preferably 0.5-0.7% of the "B-side" blend and is totally comprised of tertiary amine catalysts, optionally with less than 1% of an organo-tin catalyst or an organo-bismuth catalyst. The resultant reaction exotherm is heavily dependent on the type and concentration of the catalyst. PVC window lineals will deform when the experience temperatures of around 160-180° F.

(71-82° C.). The combination of excessive pressure producing crosslink density and reaction exotherm will distort the window lineal. Standard industry systems have catalyst packages in amounts of typically 4-6%. Using a catalyst concentration of about 5.25% produced a reaction peak exotherm of 186.8° F. (86.0° C.) a temperature which will cause deformation of the vinyl window lineal. For the instant invention, one effective composition employs a two component catalyst system. One catalyst is about 0.3% of Dabco® T N-[2-(dimethylamino)ethyl]-N-methylethanolamine. Dabco® T is a water-soluble, reactive amine catalyst (hydroxyl value of 387) that is commonly used in the formulation of packaging foams. It is a catalyst specifically used to promote water-isocyanate blowing reactions. The other catalyst is Polycat® 5 (pentamethyldiethylenetriamine), employed as a co-catalyst at a 0.2% concentration, and is a balanced blowing/gelation tertiary amine catalyst primarily used to drive the gelation reaction.

Without being held to any one theory or mode of operation, it is believed that the combination of high functional low molecular weight polyols and a very high molecular weight ethylene oxide triol also facilitates the unique chemistry. The former is Voranol® 360, a sucrose/glycerine polyol with a 4.5 functionality at 1.8% of the "B-side" blend and the latter, Jeffol® G 31-35 at a concentration of 5.9% of the "B-side." The sucrose/glycerine molecule provides for packed, in-place dimensional stability while the elastomeric Jeffol® G 31-35 provides for chain entanglement and packing without distorting the window lineal. This also promotes dimensional stability.

What has been shown is that the formulation may be blown with a blowing agent having a boiling point of between approximately 5-50° C., more preferably 10-40° C. The blowing agent must maintain the resultant foam froth in a flowing state. The water concentration may range between approximately 10-20% of the formulation, with a preferred composition of approximately 14-15%.

The total monofunctional surfactant package is employed at a level of from approximately 30-55%. While specific surfactants are identified, it is recognized that other types of monofunctional nonionic surfactants in combination could be employed as chain terminators. Low HLB monofunctional nonionic surfactants, while detrimental to blend emulsification, would have the same effect on chain termination and the lowering of the crosslink density.

Initial studies of the foaming reaction employed a catalyst package of 5.25% on the "B-side." This created a reaction profile with a gel time of 18 seconds and a tack time of 22 seconds. Despite this relatively quick cure profile for a pour-in-place formulation, the foam filled a 16 foot long window lineal hollow. However, this level of catalyst concentration (about 5.25%) produced a reaction peak exotherm of 186.8° F. (86.0° C.) a temperature which will cause deformation of the vinyl window lineal, and therefore, unacceptable for use for its intended application. In subsequent formulations, the catalyst concentration was decreased in order to lower the exotherm of the reaction as well as to increase the gel and tack times. The chance of distorting a window lineal will increase as the exotherm and chemical energy in the form of pressure increases. It is important that both are minimized. Further studies have demonstrated that a total catalyst package of 0.35% was an insufficient amount of catalyst to reasonably drive the reaction, with 0.5-0.7% being one preferred concentration based on a defined set of other components in the "B-side" cylinder.

It is believed that there are a myriad of efficacious combinations of high functional, low molecular weight polyols and very high molecular weight ethylene oxide triols. They could exist in concentrations to 5-20% of the "B-side" blend. In a most preferred embodiment, this concentration is 7-8%.

In another aspect of the invention, a highly active polysiloxane polyoxyalkylene block copolymer is employed at a concentration of less than 1%. However, other suitable polysiloxane surfactants could be used.

As described hereinbelow, Jeffol G 31-35 (a glycerine initiated ethylene oxide triol) has a viscosity at 25° C. of 875 cP, an OHV number of 35 and a functionality of 3.0; and Jeffol SG-360 (a sucrose/glycerine copolymer of 30/70) has a viscosity at 25° C. of 3,152 cP, an OHV number of 360 and a functionality of 4.5.

In one aspect of the invention, a disposable and/or refillable pressurized two-component foam formulation is illustrated. The system is optionally, but preferably, portable. The propellant is preferably a high boiling point propellant with minimal to zero ozone depleting potential in addition to a stable shelf life. One compositional range of components is illustrated in Table II.

TABLE II

|  | Wt % |
|---|---|
| Polyol | |

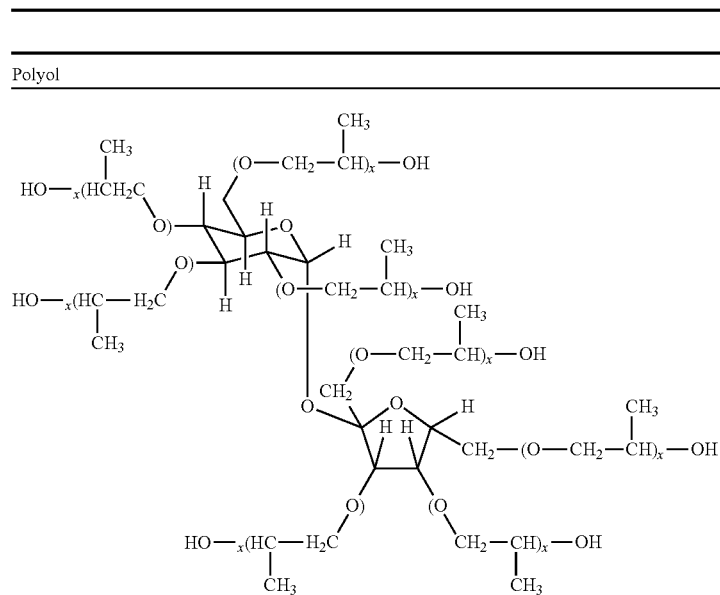

The sucrose polyether polyol based on a sucrose-glycerol mixture with a functionality of ~4.5 for dimensional stability in a flexible foam/high water content formulation. The polyol has a hydroxyl number of ~360.   1-5%

TABLE II-continued

| | | Wt % |
|---|---|---|
| 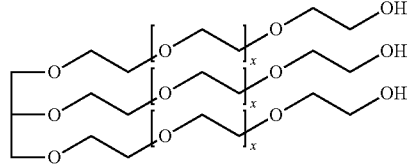 | ethylene oxide triol, ethylene oxide capped and glycerine initiated. The polyol has a hydroxyl number of ~35 and a M.W. of ~4800. Provides for chain entanglement and packing without distorting the lineal. | 2-15% |

Flame Retardant

| | | |
|---|---|---|
| tris(1-chloro-2-propyl)phosphate 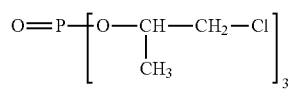 | The composition supplies elemental phosphorus at 9.3% by weight and supplies elemental chloride at 33.0% by weight (both Class I ratings). | 25-50% |

Non-Ionic Surfactants

| | | |
|---|---|---|
| Nonoxynol-9 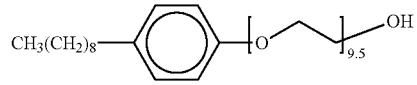 | The hydroxyl number is ~88. | 30-55% |
| L12-8 ethoxylated alcohol (dodecyl alcohol ethoxylate) 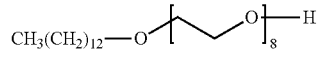 | The composition is added to optimize the emulsification only with an HLB = 13.6 and 68% ethylene oxide content and a M.W. = 516. The hydroxyl number is ~109. | 0.05-3% |

Polysilane Surfactant

| | | |
|---|---|---|
| Tegostab ® B 8250 non-hydrolyzable polysilane | The polyethersilane assists in providing an optimal flexible polyurethane foam surfactant. It has strong nucleation and froth-support effect, releasing $CO_2$. | <1% |

Catalyst(s)

| | | |
|---|---|---|
| 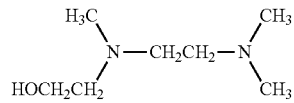 | Monofunctional diamine catalyst. | <1% |
| 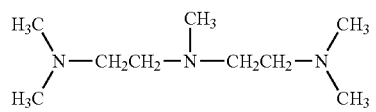 | Triamine catalyst. | |
| $(CH_3(CH_2)_3)_2—Sn—S(CH_2)_{11}CH_3$ | Organometallic tin catalyst. | 0-<1% |

The above "B" side (50-75% polyols) was mixed with an "A" side (90-95% PMDI) in an approximately 50/50 ratio with an appropriate amount of propellant necessary to bring the total of each side to 100% as shown below in Table III.

TABLE III

| Component | Description | Weight %(*) |
|---|---|---|
| "A" | Polymeric methylene diisocyanate | 100% |
| "B" | Polyol Blend | |
| (i) | Blend component (a) - ethylene oxide triol | 2-15% |
| (ii) | Blend component (b) - sucrose/glycerol polyol | 1-5% |
| | Flame Retardant | |
| (i) | Phosphate | 25-50% |
| | Catalyst(s) | |
| (i) | Tertiary amine - pentamethyldiethylenetriamine, e.g., POLYCAT® 5 | <1% |
| (ii) | Tertiary amine - N-[2-(dimethylamino)ethyl]-N-methylethanolamine, e.g., DABCO® T | <1% |
| (iii) | Organotin - dibutyl tin dilauryl mercaptide, e.g., DABCO® T-120 | 0-<1% |

TABLE III-continued

| Component | Description | Weight %(*) |
|---|---|---|
| | Surfactant(s) | |
| (i) | polyethoxylate of nonylphenol | 30-55% |
| (ii) | alcohol ethoxylate | 0.05-3% |
| (iii) | non-hydrolyzable polysilane (Si—C type) | <1% |
| | Water | balance |
| | Final Formulation | |
| "A" | PMDI | 91% |
| | $CF_3CH_2CHF_2$ (HFC-245fa) | 9% |
| "B" | Blend | 86% |
| | $CF_3CH_2CHF_2$ (HFC-245fa) | 14% |

(*)Percentages of components listed for the "B" side are adjusted so that the total weight is 100% & the A/B ratio ~1/1 ± 10-15%

Effective Blowing agents are illustrated in Table IV.

TABLE IV

| Blowing Agents | Common Name | M.W. | B.P. | ODP |
|---|---|---|---|---|
| $CF_3CH_2CHF_2$ | HFC-245fa | 134 | 15.3° C. | 0 |
| $CF_3CH_2CF_2CH_3$ | HFC-365mfc | 148 | 40.2° C. | 0 |
| $CF_3CH=CH_2Cl$ | HBA-2 (SOLSTICE™ LBA) | 131 | 19° C. | 0 |
| $CF_3CH=CHCF_3$ | FEA-1100 | 164 | 33° C. | 0 |
| | AFA-L1 | <134 | >10° C. and <30° C. | 0 |
| | AFA-L2 | <134 | >10° C. and <30° C. | 0 |

While the above blowing agents are listed individually, it is recognized that miscible binary and ternary blends of the agents listed above, in addition to miscible blends which fall both within the higher boiling point range as well as outside the range, are useful in the practice of the invention. At least one of the agents (preferably the blowing agent in the major amount) will fall within the higher boiling point range.

Listed more generically, the blowing agents having up to four carbon atoms in their backbone and which are useful in this invention fall within the general formula (I) illustrated below:

$$[CV_a]_m\text{-}A\text{-}[CX_b]_n\text{—}B\text{—}[CY_c]_o\text{-}D\text{-}[CZ_d]_p$$

wherein
C is a carbon atom;
V, X, Y & Z are independently selected from the group consisting of H, F and Cl (with similar definitions applied as illustrated previously);
a & d are independently selected from the integral values ranging from 0 to 3 inclusive;
b & c are independently selected from the integral values ranging from 0 to 2 inclusive;
o, p & n are equal to 1;
m is selected from the integral values ranging from 0 to 1 inclusive;
A, B & D are covalent bonds sufficient to satisfy the available bonding sites of adjacent carbon atoms, if such carbon atoms are present; and
said blowing agent, including miscible blends and azeotropes thereof, having a boiling point between approximately 5-50° C., and an ozone depletion potential of essentially zero.
said foam system having a reaction profile gel and tack time which is less than approximately 90 seconds, more preferably less than approximately 3 minutes or greater; and
in a preferred embodiment, said blowing agent is non-flammable, recognizing that co-blowing agents may be flammable.

Listed more generically, the blowing agents having up to six carbon atoms in their backbone and which are useful in this invention fall within the general formula (II) illustrated below:

$$[CU_e]_q\text{-}E\text{-}[CW_f]_r\text{—}F\text{—}[CV_a]_m\text{-}A\text{-}[CX_b]_n\text{—}B\text{—}[CY_c]_o\text{-}D\text{-}[CZ_d]_p$$

wherein
C is a carbon atom;
U, W, V, X, Y and Z are independently selected from the group consisting of H, F and Cl (with similar definitions applied as illustrated previously);
d & e are independently selected from the integral values ranging from 0 to 3 inclusive;
a, b, c & f are independently selected from the integral values ranging from 0 to 2 inclusive;
o, p & n are equal to 1;
m, q & r are independently selected from the integral values ranging from 0 to 1 inclusive;
A, B, D, E and F are covalent bonds sufficient to satisfy the available bonding sites of adjacent carbon atoms, if such carbon atoms are present;
said blowing agent having a boiling point between approximately 5-50° C., and an ozone depletion potential of not greater than 0.05;
said foam system having a reaction profile gel and tack time which is approximately three minutes or greater; and in a preferred embodiment, said blowing agent is non-flammable, recognizing that co-blowing agents may be flammable, but not preferred or present in such small amounts as to render the overall composition non-flammable.

In a preferred embodiment, the blowing agent is a carbon-based moiety with defined fluorine atoms bonded to the carbon backbone. The boiling point of the blowing agent will be as defined previously as well as the vapor pressure.

The application uses HFC-245fa, FEA-1100, HFC-365mfc, HBA-2 (SOLSTICE™ LBA), AFA-L1, AFA-L2, including miscible blends and azeotropes thereof, in an effective amount as a blowing agent component, with some nitrogen to top off the froth foam cylinders to better enable complete dispensing achieves mold cavity filling characteristics which are not traditionally experienced with high pressure impingement foaming applications. The application may optionally employ a co-blowing agent, e.g., water, to reduce the density of the foam and to help open cells (thereby relieving pressure) during cure via the formation of polyurea segments. It is believed that the combination of water with methylene diphenyldiisocyanate form polyurea structures, which disrupt cell formation, thereby assisting in achieving a high open cell content. The blowing agent can be a blend of blowing agents or an azeotrope thereof. When used as a blend, an effective amount of a blowing agent having the characteristics of higher boiling point and lower vapor pressure is required.

In one aspect of the invention, the conclusion that it was possible to substitute a higher boiling point blowing agent at a 1:1 substitution level for a lower boiling point blowing agent, is quite surprising. Without being held to any one theory of operation, the supplemental use of nitrogen-pressurized cylinders (other non-reactive gases could be employed at least in part, but not for all of the higher boiling point blowing agent) is believed to be at least one aspect of this invention.

The following compositions were made varying the amount of catalyst in the formulation. The blowing agent was HFC-245fa, except where noted 134a in one column in Table V.

TABLE V

| "B"-side Component | Catalyst Concentration (Total) | | | | | |
|---|---|---|---|---|---|---|
| | 5.25% WLF3-245fa | 2.20% WLF3-245fa | 0.70% WLF2-245fa | 0.50% WLF2-245fa | 0.50% WLF2-134a | 0.35% WLF2-245fa |
| Jeffol ® G 31-35 | 5.90 | 5.90 | 5.90 | 5.90 | 5.90 | 5.90 |
| Voranol ® 360 | 1.80 | 1.80 | 1.80 | 1.80 | 1.80 | 1.80 |
| TCPP | 25.25 | 28.30 | 29.80 | 30.00 | 30.00 | 30.15 |
| Surfonic N-95 | 44.70 | 44.70 | 44.70 | 44.70 | 44.70 | 44.70 |
| Surfonic L12-8 | 1.00 | 1.00 | 1.00 | 1.00 | 1.00 | 1.00 |
| Tegostab ® B 8250 | 0.50 | 0.50 | 0.50 | 0.50 | 0.50 | 0.50 |
| Dabco ® T | 2.50 | 0.80 | 0.40 | 0.30 | 0.30 | 0.20 |
| Dabco ® T-120 | 1.75 | 0.60 | 0.00 | 0.00 | 0.00 | 0.00 |
| Polycat ® 5 | 1.00 | 0.80 | 0.30 | 0.20 | 0.20 | 0.15 |
| Water | 14.60 | 14.60 | 14.60 | 14.60 | 14.60 | 14.60 |
| Reactint ® AQ 545 | 1.00 | 1.00 | 1.00 | 1.00 | 1.00 | 1.00 |
| Total | 100.00 | 100.00 | 100.00 | 100.00 | 100.00 | 100.00 |

"B-side" composition is @ 86% with 14% of the propellant HFC-245fa (except where noted 134a)
"A-side" composition is @ 91% with 9% of the propellant HFC-245fa (except where noted 134a)

The above compositions were tested and characterized in Table VI. What is noted is that with insufficient catalyst present (as illustrated by long gel and tack times), the foam did not possess sufficient integrity and a visible and noticeable shrinkage occurred with the foam. This is undesirable and negatively impacts the insulation capability of the invention. However, catalyst concentrations of approximately 0.5-2%, more preferably 0.5 to 1.5%, most preferably 0.5 to 1.0% produced foams with good structural integrity, yet long enough gel and tack times so as to allow the reaction to maintain itself in the froth state, thereby allowing longer lengths of window lineals to be completely filled. This is contrary to expectations in the prior art which would lead an experimenter to consider higher catalyst levels to increase the reactivity of the polyol blend. In light of the need to limit the exothermic nature of the reaction, it is noted that catalyst concentrations which were greater than or equal to 0.5, but less than or equal to about 2 weight percent, achieved the lowest exotherms, but yet acceptable ranges of gel and tack times.

As illustrated in Table VI, The catalysts labeled WLF2-245fa and WLF2-245fa, at amounts of between 0.7 and 0.5 weight % respectively, produced sufficiently long gel and tack times (2 to 6 minutes), in addition to maintaining the peak exotherms below temperatures at which vinyl begins to deform, namely 160-180° F. (71-82° C.).

TABLE VI

| Formulation | Catalyst (%) | Gel Time (min:sec) | Tack Time (min:sec) | Peak Exotherm (° C.) | Peak Exotherm (° F.) | A/B ratio (g/g) | Closed Cell (%) | Density (pcf) |
|---|---|---|---|---|---|---|---|---|
| WLF3-245fa | 5.25 | 0:18 | 0:22 | 86.0 | 186.8 | 0.96 | 2.97 | 0.94 |
| WLF3-245fa | 2.20 | 0:42 | 0:54 | 89.5 | 193.1 | 0.92 | 2.34 | 1.14 |
| WLF2-245fa | 0.70 | 2:14 | 4:39 | 76.3 | 169.3 | 0.97 | 4.36 | 0.89 |
| WLF2-245fa | 0.50 | 3:37 | 5:32 | 70.4 | 158.7 | 1.02 | 3.10 | 0.89 |
| WLF2-134a | 0.50 | 3:23 | 6:05 | 70.2 | 158.4 | 0.91 | 6.78 | 1.04 |
| WLF2-245fa | 0.35 | 5:44 | 9:26 | 59.0 | 138.2 | 1.05 | 15.27 | 1.06 |

At least one aspect of this invention resides in the ability to recognize that efficacy in filling PVC window lineals is attributable to the "flowability" of the foam. In contrast to co-owned and co-pending patent application U.S. Ser. No. 13/646,785, the following differences are noted. Whereas the block fill foam is a closed cell and requires a high crosslink density in order to be dimensionally stable in the channel, these characteristics would be an anathema to the window lineal foam, which requires the ability to pack and not distort a window lineal as noted in Table VII.

TABLE VII

|  | Block Fill foam (preferred) | Window Lineal foam (preferred) |
|---|---|---|
| % water | 1.0% | 10-20% (15%) |
| % catalyst | 2.2% | 0.4-2% (0.5-0.7%) |
| gel time | <1 min. | 2-6 min. (>3 min. <5 min.) |
| "B-side" OHV (polyol only) | 200-400 (300) | 5-20 (8.5) |
| Polyol concentration | 60-65% | 5-10% |
| Pressure Build | irrelevant | important |
| Robustness | sturdy | sensitive |

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for filling a window lineal cavity with a frothable polyurethane or a polyisocyanurate foam system without deforming a polymeric window lineal profile, said process comprising the step of:
adding a two-component polyurethane or polyisocyanurate foam precursor to said cavity, said foam precursor comprising an effective amount of at least one blowing agent, including miscible blends and azeotropes thereof, said blowing agent comprising formula (I):

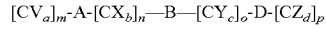

wherein
C is a carbon atom;
V, X, Y and Z are independently selected from the group consisting of H, F and Cl;
a & d are independently selected from the integral values ranging from 0 to 3 inclusive;
b & c are independently selected from the integral values ranging from 0 to 2 inclusive;
o, p & n are equal to 1;
m is selected from the integral values ranging from 0 to 1 inclusive;
A, B and D are covalent bonds sufficient to satisfy the available bonding sites of adjacent carbon atoms, if such carbon atoms are present;
said at least one blowing agent having a boiling point between approximately 5-50° C., and an ozone depletion potential of not greater than 0.05;
said foam system having a reaction profile gel and tack time which is approximately between 2-6 minutes and said foam system having a peak exotherm below a temperature at which the polymeric window lineal profile deforms, said times and temperature attributable at least in part to a "B-side" composition which comprises:
approximately between 0.4-2 weight % of at least one amine catalyst;
approximately between 3-20 weight % of a polyol blend;
approximately between 25-50 weight % of at least one phosphate flame retardant;
approximately between 30-58 weight % of at least one non-ionic surfactant;
a balance of water, said balance being no less than about 10-20 weight %;
components within said "B-side" composition adjusted to total 100%.

2. The process of claim 1 wherein
said amine catalyst is added at approximately between 0.5-1.5 weight % of said "B-side".

3. The process of claim 1 wherein formula (I) is selected from the group consisting of
CHF$_3$CH$_2$CHF$_3$, CH$_3$CF$_2$CH$_2$CF$_3$, trans-CF$_3$CH=CHCl, cis-CF$_3$CH=CHCF$_3$, CF$_3$CH=CHCl (E), miscible blends and azeotropes thereof and further wherein formula (I) is a major amount of said blowing agent.

4. The process of claim 3 wherein said blowing agent has a boiling point between approximately 10-40° C.

5. The process of claim 4 wherein
a peak reaction exotherm is no higher than about 180° F. (82° C.).

6. The process of claim 5 wherein
said reaction profile gel and tack time is approximately between 2-4 minutes.

7. The process of claim 6 wherein said "B-side" catalyst further comprises:
at least three different catalysts.

8. The process of claim 1 said process further comprises the step of:
adding said frothable polyurethane or said polyisocyanurate foam precursor into a proximal side of said window lineal and allowing said polymerization to proceed toward a distal side of said window lineal, both said proximal and distal sides being open.

9. The process of claim 8 wherein
said step of adding to said window lineal has said window lineal in a horizontal position.

10. A process for filling a window lineal cavity with a frothable polyurethane or a polyisocyanurate foam system without deforming a polymeric window lineal profile, said process comprising the step of:
adding a two-component polyurethane or polyisocyanurate foam precursor to said cavity, said foam precursor comprising an effective amount of at least one blowing agent, including miscible blends and azeotropes thereof, said blowing agent comprising formula (II):

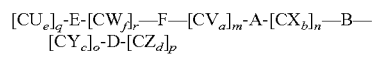

wherein
C is a carbon atom;
U, W, V, X, Y and Z are independently selected from the group consisting of H, F and Cl;
d & e are independently selected from the integral values ranging from 0 to 3 inclusive;
a, b, c & f are independently selected from the integral values ranging from 0 to 2 inclusive;
o, p & n are equal to 1;
m, q & r are independently selected from the integral values ranging from 0 to 1 inclusive;

A, B, D, E and F are covalent bonds sufficient to satisfy the available bonding sites of adjacent carbon atoms, if such carbon atoms are present;

said at least one blowing agent having a boiling point between approximately 5-50° C., and an ozone depletion potential of not greater than 0.05;

said foam system having a reaction profile gel and tack time which is approximately between 2-6 minutes and said foam system having a peak exotherm below a temperature at which the polymeric window lineal profile deforms, said times and temperature attributable at least in part to a "B-side" composition which comprises:

approximately between 0.4-2 weight % of at least one amine catalyst;

approximately between 3-20 weight % of a polyol blend;

approximately between 25-50 weight % of at least one phosphate flame retardant;

approximately between 30-58 weight % of at least one non-ionic surfactant;

a balance of water, said balance being no less than about 10-20 weight %;

components within said "B-side" composition adjusted to total 100%.

11. The process of claim 10 wherein
said amine catalyst is added at approximately between 0.5-1.5 weight % of said "B-side".

12. The process of claim 10 wherein formula (II) is selected from the group consisting of $CH_2CH_2CF_3$, $CH_3CF_2CH_2CF_3$, trans-$CF_3CH=CHCl$, cis-$CF_3CH=CHCF_3$, $CF_3CH=CHCl$ (E), miscible blends and azeotropes thereof and further wherein formula (II) is a major amount of said blowing agent.

13. The process of claim 12 wherein said blowing agent has
a boiling point between approximately 10-40° C.

14. The process of claim 13 wherein
a peak reaction exotherm is no higher than about 180° F. (82° C.).

15. The process of claim 14 wherein
said reaction profile gel and tack time is approximately between 2-4 minutes.

16. The process of claim 15 wherein said "B-side" catalyst further comprises:
at least three different catalysts.

17. The process of claim 10 said process further comprises the step of:
adding said frothable polyurethane or said polyisocyanurate foam system precursor into a proximal side of said window lineal and allowing said polymerization proceed toward a distal side of said window lineal, both said proximal and distal sides being open.

18. The process of claim 17 wherein
said step of adding to said window lineal has said window lineal in a horizontal position.

* * * * *

UNITED STATES PATENT AND TRADEMARK OFFICE
CERTIFICATE OF CORRECTION

PATENT NO. : 9,593,222 B2
APPLICATION NO. : 13/893443
DATED : March 14, 2017
INVENTOR(S) : Taylor et al.

It is certified that error appears in the above-identified patent and that said Letters Patent is hereby corrected as shown below:

In the Specification

Column 8, Line 61, delete "002" and insert --$CO_2$--.

Column 12, Line 14, delete "NB," and insert --A/B--.

In the Claims

Claim 3, Column 22, Line 19, delete "$CHF_3CH_2CHF_3$" and insert --$CHF_2CH_2CF_3$--.

Signed and Sealed this
Twenty-third Day of May, 2017

Michelle K. Lee
*Director of the United States Patent and Trademark Office*